United States Patent
Park et al.

(10) Patent No.: US 12,409,407 B2
(45) Date of Patent: Sep. 9, 2025

(54) CARBON DIOXIDE CAPTURING APPARATUS AND CAPTURING METHOD

(71) Applicant: KOREA RESEARCH INSTITUTE OF CHEMICAL TECHNOLOGY, Daejeon (KR)

(72) Inventors: Yong Ki Park, Daejeon (KR); Hwi Min Seo, Daejeon (KR); Ki Woong Kim, Daejeon (KR); Dae Jin Kim, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 692 days.

(21) Appl. No.: 17/597,132

(22) PCT Filed: Feb. 26, 2020

(86) PCT No.: PCT/KR2020/002776
§ 371 (c)(1),
(2) Date: Dec. 27, 2021

(87) PCT Pub. No.: WO2020/262795
PCT Pub. Date: Dec. 30, 2020

(65) Prior Publication Data
US 2022/0266193 A1 Aug. 25, 2022

(30) Foreign Application Priority Data
Jun. 28, 2019 (KR) .................. 10-2019-0078062

(51) Int. Cl.
*B01D 53/22* (2006.01)
*B01D 53/12* (2006.01)
(Continued)

(52) U.S. Cl.
CPC ............. *B01D 53/12* (2013.01); *B01D 53/62* (2013.01); *B01D 53/83* (2013.01); *B01D 53/96* (2013.01);
(Continued)

(58) Field of Classification Search
CPC ........ B01D 53/12; B01D 53/62; B01D 53/83; B01D 53/96; B01D 2252/204;
(Continued)

(56) References Cited

U.S. PATENT DOCUMENTS 8,568,520 B2  10/2013 Ohashi et al.
8,753,437 B2   6/2014 Yi et al.
(Continued)

FOREIGN PATENT DOCUMENTS

JP  2011-098340 A  5/2011
JP  2013-226476 A  11/2013
(Continued)

OTHER PUBLICATIONS

International Search Report (and English Translation) and Written Opinion of International Application No. PCT/KR2020/00277, mailed on Jun. 12, 2020, 8 pages.

*Primary Examiner* — Anthony R Shumate
(74) *Attorney, Agent, or Firm* — Heslin Rothenberg Farley & Mesiti P.C.; George S. Blasiak, Esq.

(57) ABSTRACT

Provided is a carbon dioxide capturing apparatus comprising: a reaction tower including a carbon dioxide adsorption unit or a carbon dioxide absorption unit which adsorbs or absorbs carbon dioxide from exhaust gas; desorption tower connected to the reaction tower and including an adsorbent heating unit for heating an adsorbent circulating inside or an absorbent heating unit for heating an absorbent circulating inside; an adsorbent or absorbent which circulates in the reaction tower and the desorption tower and alternately
(Continued)

adsorbs and desorbs carbon dioxide or alternately absorbs and desorbs carbon dioxide; and a heat exchange unit which desorbs carbon dioxide from the adsorbent on which carbon dioxide is adsorbed or the absorbent in which carbon dioxide is absorbed, through heat exchange between the adsorbent on which carbon dioxide is adsorbed and the heated adsorbent, or between the absorbent in which carbon dioxide is absorbed and the heated absorbent, wherein the adsorbent on which carbon dioxide is adsorbed and the heated adsorbent, or the absorbent in which carbon dioxide is absorbed and the heated absorbent are transferred in a co-current flow manner.

7 Claims, 6 Drawing Sheets (51) Int. Cl.
- *B01D 53/62* (2006.01)
- *B01D 53/83* (2006.01)
- *B01D 53/96* (2006.01)

(52) U.S. Cl.
CPC ............ *B01D 2252/204* (2013.01); *B01D 2253/102* (2013.01); *B01D 2253/108* (2013.01); *B01D 2257/504* (2013.01); *B01D 2258/0291* (2013.01); *B01D 2259/128* (2013.01)

(58) Field of Classification Search
CPC ........ B01D 2253/102; B01D 2253/108; B01D 2257/504; B01D 2258/0291; B01D 2259/128
See application file for complete search history.

(56) References Cited

U.S. PATENT DOCUMENTS

| | | | |
|---|---|---|---|
| 8,894,753 B2 | 11/2014 | Park et al. | |
| 9,545,601 B2 | 1/2017 | Nakamura | |
| 9,694,312 B2 | 7/2017 | Park et al. | |
| 2003/0140786 A1* | 7/2003 | Iijima | B01D 53/1475 95/236 |
| 2011/0079151 A1 | 4/2011 | Ohashi et al. | |
| 2011/0107737 A1* | 5/2011 | Mishima | F02C 3/28 60/39.461 |
| 2011/0126715 A1* | 6/2011 | Kimura | B01D 53/185 96/242 |
| 2013/0087047 A1 | 4/2013 | Yi et al. | |
| 2014/0251136 A1 | 9/2014 | Park et al. | |
| 2014/0369913 A1 | 12/2014 | Nakamura et al. | |
| 2016/0016108 A1 | 1/2016 | Park et al. | |
| 2016/0220943 A1 | 8/2016 | Yoshikawa et al. | |
| 2022/0266193 A1* | 8/2022 | Park | B01D 53/12 |

FOREIGN PATENT DOCUMENTS

| | | |
|---|---|---|
| JP | 2015-150464 A | 8/2015 |
| KR | 10-2005-0003767 A | 1/2005 |
| KR | 10-2010-0099929 A | 9/2010 |
| KR | 10-2013-0039185 A | 4/2013 |
| KR | 10-2014-0001721 A | 1/2014 |
| KR | 10-2014-0112443 A | 9/2014 |
| KR | 10-1480654 B1 | 1/2015 |
| KR | 10-1509389 B1 | 4/2015 |
| KR | 10-2033745 B1 | 10/2019 |

* cited by examiner

CARBON DIOXIDE CAPTURING APPARATUS AND CAPTURING METHOD

CROSS REFERENCE TO RELATED APPLICATIONS

This application is a national stage filing under section 371 of International Application No. PCT/KR2020/002776 filed on Feb. 26, 2020, and published on Dec. 30, 2020 as WO2020/262795, which claims priority to Korean Application No. 10-2019-0078062 filed on Jun. 28, 2019. The entire contents of WO2020/262795 are hereby incorporated herein by reference.

BACKGROUND OF THE INVENTION

Field of the Invention

The present disclosure relates to a carbon dioxide capturing apparatus and a carbon dioxide capturing method, and more particularly, to a carbon dioxide capturing apparatus and a carbon dioxide capturing method capable of selectively capturing and separating carbon dioxide included in exhaust gas.

Description of the Related Art

Recently, as the glaciers in the polar regions are melt due to global warming, the sea level is rising and extreme weather is occurring all over the earth due to climate change. It has been known that such global warming is due to the emission of greenhouse gases such as carbon dioxide. International regulations for regulating the carbon dioxide emissions have been concluded, and suppressing the emission of carbon dioxide by the introduction of carbon credits and the like has become an economic issue in each country. Efforts to reduce the carbon dioxide emissions are directed in a direction of developing alternative energy capable of replacing fossil fuels, such as solar energy and wind energy, and in a direction of capturing and storing carbon dioxide generated from fossil fuels without emitting carbon dioxide in an atmosphere. The latter technology is called carbon capture and storage (CCS), and is largely divided into a technology for capturing carbon dioxide generated in power plants or steel mills, and a technology for storing the captured carbon dioxide underground or in the ocean.

The technology for capturing carbon dioxide may be divided into post-combustion capturing, pre-combustion capturing, and pure oxygen capturing, depending on the application of the capturing stage. In addition, the technology may be divided into membrane separation concentrating using a separation membrane, liquid phase separation using a liquid absorbent such as amine or ammonia, and solid phase separation using a solid absorbent such as an alkali or alkaline earth metal according to the principle of capturing carbon dioxide.

In the technology for capturing carbon dioxide, the solid phase separation largely consists of the development of a solid absorbent having carbon dioxide adsorption capacity and a process of capturing carbon dioxide using these solid absorbents, and the carbon dioxide capture efficiency is greatly affected by the configuration of the adsorption process as well as the performance of the solid absorbent. The solid absorbent is divided into an organic system, an inorganic system, a carbon system, an oil-inorganic hybrid system, and the like according to a type of material and divided into a physical absorbent, a chemical absorbent, and the like, depending on a form in which carbon dioxide is absorbed in the absorbent.

The process of capturing carbon dioxide using these solid absorbents is a method of desorbing the absorbed carbon dioxide and may be greatly divided into a process for pressure swing adsorption (PSA) and temperature swing adsorption (TSA) using a pressure difference and a temperature difference. In general, the PSA process using a fixed-bed absorption tower is advantageous for small-scale carbon dioxide capture, but in the case of a large amount of carbon dioxide emitted from a power plant or a large-scale combustion furnace, the TSA process consisting of fluidized-bed absorption and desorption towers being easy to scale-up is advantageous.

In the related prior art, in Korean Patent Publication Nos. 2005-0003767 and 2010-0099929, and the like, there is disclosed a TSA-concept carbon dioxide capturing method consisting of an absorption tower and a desorption tower to capture carbon dioxide using a solid dry absorbent. The TAS-concept dry capturing process takes a lot of energy to desorb the carbon dioxide absorbed by the absorbent to act as a factor to increase the capture cost together with the absorbent cost.

Therefore, in order to lower the capture cost, it is necessary to develop a technique capable of effectively removing the absorbed carbon dioxide from the absorbent with small energy.

SUMMARY OF THE INVENTION

An object of the present disclosure is to solve the above problem, and to provide a carbon dioxide capturing apparatus and a carbon dioxide capturing method capable of reducing the energy consumption required for capturing carbon dioxide.

The objects to be solved by the present disclosure are not limited to the aforementioned object(s), and other object(s), which are not mentioned above, will be apparent to those skilled in the art from the following description.

As aspect of the present disclosure provides a carbon dioxide capturing apparatus comprising: a reaction tower including a carbon dioxide adsorption unit or a carbon dioxide absorption unit which adsorbs or absorbs carbon dioxide from exhaust gas; desorption tower connected to the reaction tower and including an adsorbent heating unit for heating an adsorbent circulating inside or an absorbent heating unit for heating an absorbent circulating inside; an adsorbent or absorbent which circulates in the reaction tower and the desorption tower and alternately adsorbs and desorbs carbon dioxide or alternately absorbs and desorbs carbon dioxide; and a heat exchange unit which desorbs carbon dioxide from the adsorbent on which carbon dioxide is adsorbed or the absorbent in which carbon dioxide is absorbed, through heat exchange between the adsorbent on which carbon dioxide is adsorbed and the heated adsorbent, or between the absorbent in which carbon dioxide is absorbed and the heated absorbent, wherein the adsorbent on which carbon dioxide is adsorbed and the heated adsorbent, or the absorbent in which carbon dioxide is absorbed and the heated absorbent are transferred in a co-current flow manner.

The heat exchange unit may be provided in parallel between the reaction tower and the desorption tower.

The heat exchange unit may perform direct heat exchange or indirect heat exchange between the adsorbent on which carbon dioxide is adsorbed and the heated adsorbent, or between the absorbent in which carbon dioxide is absorbed and the heated absorbent.

The heat exchange unit performing the indirect heat exchange may include a heat medium means provided between the reaction tower and the desorption tower.

The heat exchange unit performing the direct heat exchange may include a first heat exchange unit in which the adsorbent on which carbon dioxide is adsorbed or the absorbent in which carbon dioxide is absorbed moves and a second heat exchange unit in which the heated adsorbent or the heated absorbent moves.

The heat exchange unit performing the direct heat exchange may be provided as a plate-shaped heat exchange unit or pipe-shaped heat exchange unit including one or more first heat exchange units and one or more second heat exchange units.

The plate-shaped heat exchange unit may include one or more baffles.

Another aspect of the present invention provides a carbon dioxide capturing method comprising the steps of: adsorbing or absorbing carbon dioxide from exhaust gas on an adsorbent or in an absorbent in a reaction tower; heating the adsorbent or the absorbent circulating inside by heating a desorption tower; moving the adsorbent on which the carbon dioxide is adsorbed and the heated adsorbent or the absorbent in which the carbon dioxide is absorbed and the heated absorbent to a heat exchange unit in a co-current flow manner and heat-exchanging between the adsorbent on which the carbon dioxide is adsorbed and the heated adsorbent, or between the absorbent in which the carbon dioxide is absorbed and the heated absorbent through the heat exchange unit; and desorbing the carbon dioxide of the adsorbent on which the carbon dioxide is adsorbed or the absorbent in which the carbon dioxide is absorbed through the heat exchange.

The heat exchange may be performed by direct heat exchange or indirect heat exchange between the adsorbent on which carbon dioxide is adsorbed and the heated adsorbent, or between the absorbent in which carbon dioxide is absorbed and the heated absorbent.

The adsorbing or absorbing of the carbon dioxide on the adsorbent or in the absorbent may be introducing exhaust gas from the lower end of the reaction tower, introducing a coolant from one side of the reaction tower, and adsorbing or absorbing the carbon dioxide from the exhaust gas on the adsorbent or in the absorbent.

The adsorbing or absorbing of the carbon dioxide on the adsorbent or in the absorbent may include emitting the exhaust gas from which carbon dioxide is removed from the upper side of the reaction tower after adsorbing or absorbing the carbon dioxide from the exhaust gas on the adsorbent or in the absorbent.

The heating of the circulating adsorbent or absorbent may be heating the adsorbent or the absorbent circulating inside the desorption tower through one or more heating means on one side or one end of the desorption tower.

The heating of the circulating adsorbent or absorbent may include transferring the adsorbent or the absorbent circulating inside the desorption tower in one direction by supplying sweeping gas from the lower end of the desorption tower.

The heating of the circulating adsorbent or absorbent may be transferring the adsorbent or the absorbent circulating inside the desorption tower in one direction by supplying sweeping gas from the lower end of the desorption tower and heating the adsorbent or the absorbent circulating inside the desorption tower by supplying a steam from one side of the desorption tower.

The carbon dioxide capturing method may further comprise circulating the adsorbent or the absorbent by desorbing the carbon dioxide of the adsorbent on which the carbon dioxide is adsorbed or the absorbent in which the carbon dioxide is absorbed in the step of desorbing carbon dioxide, emitting the desorbed carbon dioxide from the upper end of the desorption tower, and discharging the adsorbent or absorbent from which the carbon dioxide is desorbed and the heated adsorbent or absorbent from one end of the heat exchange unit.

According to the present disclosure, in the carbon dioxide capturing apparatus, an adsorbent or absorbent heated by a carbon dioxide reaction tower adsorbing or absorbing carbon dioxide and a heating means circulates inside a desorption tower and heat exchange is performed between the adsorbent on which carbon dioxide is adsorbed and the heated adsorbent, or between the absorbent in which carbon dioxide is absorbed and the heated absorbent, thereby reducing energy required for capturing carbon dioxide.

Sensible heat may be exchanged between the adsorbent on which carbon dioxide is adsorbed and the heated adsorbent, or between the absorbent in which carbon dioxide is absorbed and the heated absorbent through direct or indirect heat exchange between the adsorbents or the absorbents, thereby reducing energy to be supplied or removed to or from the adsorbent or the absorbent.

In addition, a plate-shaped or pipe-shaped heat exchange unit without using a separate heat transfer medium is configured in the heat exchange unit to improve the heat exchange efficiency between the adsorbent or the absorbent.

Further, the installation position of the heat exchange unit is disposed so that the adsorbent on which carbon dioxide is adsorbed and the heated adsorbent, or the absorbent in which carbon dioxide is absorbed and the heated absorbent is transmitted in a co-current flow manner to reduce the length of the reaction tower or the desorption tower, thereby less limiting the installation space of the carbon dioxide capturing apparatus.

It should be understood that the effects of the present disclosure are not limited to the effects, but include all effects that can be deduced from the detailed description of the present disclosure or configurations of the present disclosure described in appended claims.

BRIEF DESCRIPTION OF THE DRAWINGS

FIG. 3 is a diagram illustrating a flow of an adsorbent on which carbon dioxide is adsorbed and a heated adsorbent, or an absorbent in which carbon dioxide is absorbed and a heated absorbent, which pass through a heat exchange unit according to an exemplary embodiment of the present disclosure, wherein

FIG. 4 is a diagram illustrating a heat flow between the adsorbent on which carbon dioxide is adsorbed and the heated adsorbent, or between the absorbent in which carbon dioxide is absorbed and the heated absorbent in the heat exchange unit according to the exemplary embodiment of the present disclosure, wherein

DETAILED DESCRIPTION OF THE PREFERRED EMBODIMENT

The present disclosure provides a carbon dioxide capturing apparatus comprising: a reaction tower including a carbon dioxide adsorption unit or a carbon dioxide absorption unit which adsorbs or absorbs carbon dioxide from exhaust gas; desorption tower connected to the reaction tower and including an adsorbent heating unit for heating an adsorbent circulating inside or an absorbent heating unit for heating an absorbent circulating inside; an adsorbent or absorbent which circulates in the reaction tower and the desorption tower and alternately adsorbs and desorbs carbon dioxide or alternately absorbs and desorbs carbon dioxide; and a heat exchange unit which desorbs carbon dioxide from the adsorbent on which carbon dioxide is adsorbed or the absorbent in which carbon dioxide is absorbed, through heat exchange between the adsorbent on which carbon dioxide is adsorbed and the heated adsorbent, or between the absorbent in which carbon dioxide is absorbed and the heated absorbent, wherein the adsorbent on which carbon dioxide is adsorbed and the heated adsorbent, or the absorbent in which carbon dioxide is absorbed and the heated absorbent are transferred in a co-current flow manner.

Before describing the present disclosure in detail, terms or words used in this specification should not be construed as unconditionally limited to a conventional or dictionary meaning, and the inventors of the present disclosure can appropriately define and use the concept of various terms in order to describe their invention in the best method. Furthermore, it should be understood that these terms or words should be interpreted as meanings and concepts consistent with the technical idea of the present disclosure.

That is, the terms used in this specification are only used to describe a preferred embodiment of the present disclosure, and are not intended to specifically limit the contents of the present disclosure, and it should be noted that these terms are terms defined in consideration with various possibilities of the present disclosure.

In addition, in this specification, it should be understood that the singular expression may include a plural expression unless clearly indicated in another meaning in the context, and even if similarly expressed in the plural, the singular expression may include the meaning of the singular number.

Throughout this specification, when a component is described as "including" the other component, the component does not exclude any other component, but may further include any other component unless otherwise indicated in contrary.

Furthermore, when it is described that a component is "inserted or connected into" the other component, this component may be directly connected or in contact with the other component, and may be spaced apart from the other component at a predetermined distance. In addition, when a component is spaced apart from the other component at a predetermined distance, a third component or means may exist to fix and connect the corresponding component to the other component and the description of the third component or means may also be omitted.

On the contrary, when it is described that a component is "directly connected to" or "directly accesses" the other component, it should be understood that a third component or means does not exist.

Similarly, other expressions describing a relationship between components, that is, expressions such as "between" and "directly between" or "adjacent to" and "directly adjacent to" should be similarly interpreted.

In addition, in the specification, it should be understood that the terms such as "one surface", "the other surface", "one side", "the other side", "first", "second", etc., are used to clearly distinguish one component from the other component with respect to one component and the meaning of the corresponding component is not used restrictively by these terms.

In addition, in this specification, it should be understood that terms related to positions such as "upper", "lower", "left", and "right" are used to indicate relative positions with respect to the corresponding component in the drawing, and unless an absolute position is specified with respect to their positions, these position-related terms should not be construed as referring to an absolute position.

In addition, in this specification, in specifying the reference numerals for each component in each drawing, like reference numerals indicate like components throughout the specification, so that the same components has the same reference number even if it is shown in different drawings.

In the drawings appended to this specification, a size, a position, a coupling relationship, etc. of each component constituting the present disclosure may be described while being partially exaggerated, reduced, or omitted for sufficiently clearly delivering the spirit of the present disclosure or for the convenience of description, and thus, the proportion or scale thereof may not be exact.

Further, hereinafter, in the following description of the present disclosure, a detailed description of a configuration determined to unnecessarily obscure the subject matter of the present disclosure, for example, known technologies including the related arts may be omitted.

Hereinafter, the present disclosure will be described in detail.

The present disclosure provides a carbon dioxide capturing apparatus comprising: a reaction tower comprising a carbon dioxide adsorption unit or a carbon dioxide absorption unit which adsorbs or absorbs carbon dioxide from exhaust gas; a desorption tower connected to the reaction tower and comprising an adsorbent heating unit for heating an adsorbent circulating inside or an absorbent heating unit for heating an absorbent circulating inside; an adsorbent or absorbent which circulates in the reaction tower and the desorption tower, alternately adsorbs and desorbs carbon dioxide or alternately absorbs and desorbs carbon dioxide; and a heat exchange unit which desorbs carbon dioxide from the adsorbent on which carbon dioxide is adsorbed or the absorbent in which carbon dioxide is absorbed, through heat exchange between the adsorbent on which carbon dioxide is adsorbed and the heated adsorbent, or between the absorbent in which carbon dioxide is absorbed and the heated absorbent, wherein the adsorbent on which carbon dioxide is adsorbed and the heated adsorbent, or the absorbent in which carbon dioxide is absorbed and the heated absorbent are transferred in a co-current flow manner. The present disclosure relates to temperature swing adsorption type apparatus and method for capturing carbon dioxide using a circulating fluidized bed reactor in which an adsorbent or an absorbent of adsorbing or absorbing carbon dioxide contained in exhaust gas emitted from a power plant or combustion furnace is circulated.

The present disclosure is to use sensible heat of the adsorbent or absorbent when the adsorbent or absorbent circulates in the reaction tower and the desorption tower, thereby enhancing the energy efficiency by inducing direct or indirect heat exchange between the adsorbents or absorbents.

According to the present disclosure, when configuring the carbon dioxide capturing apparatus, since the heat exchange is enabled between an adsorbent on which low-temperature carbon dioxide emitted from the reaction tower is adsorbed and a high-temperature heated adsorbent emitted from the desorption tower, or an absorbent on which low-temperature carbon dioxide emitted from the reaction tower is absorbed and a high-temperature heated absorbent emitted from the desorption tower to greatly reduce a load on the cooling of the adsorbent or absorbent in the reaction tower and a load on the heating of the adsorbent or absorbent in the desorption tower, thereby greatly reducing the energy required for capturing carbon dioxide.

Further, the present disclosure relates to a carbon dioxide capturing apparatus in which the installation position of the heat exchange unit is disposed so that the adsorbent on which carbon dioxide is adsorbed and the heated adsorbent, or the absorbent in which carbon dioxide is absorbed and the heated absorbent is transmitted in a co-current flow manner to reduce the length of the reaction tower or the desorption tower, thereby less limiting the installation space.

Hereinafter, the present disclosure will be described in more detail with reference to the drawings.

Figure 1:
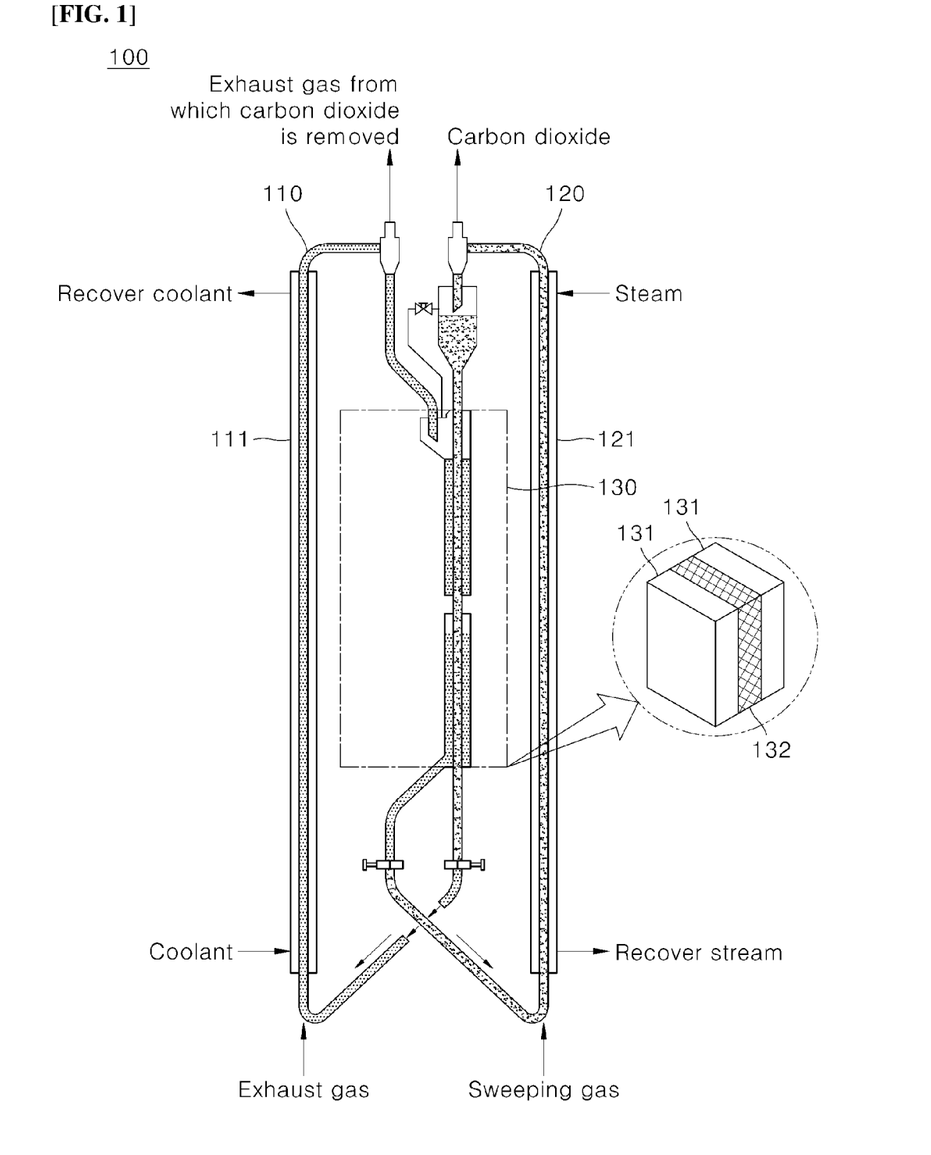
FIG. 1 is a diagram illustrating a carbon dioxide capturing apparatus according to an exemplary embodiment of the present disclosure.

FIG. 1 illustrates a carbon dioxide capturing apparatus according to an exemplary embodiment of the present disclosure.

Referring to FIG. 1, a carbon dioxide capturing apparatus 100 according to an exemplary embodiment of the present disclosure includes a reaction tower 110, a carbon dioxide adsorption unit or carbon dioxide absorption unit 111, a desorption tower 120, an adsorbent heating unit or absorbent heating unit 121, and a heat exchange unit 130. The reaction tower 110 includes the carbon dioxide adsorption unit 111 or the carbon dioxide absorption unit 111 for adsorbing or absorbing carbon dioxide from exhaust gas. The desorption tower 120 includes the adsorbent heating unit 121 for heating an adsorbent 140 circulating inside or the absorbent heating unit 121 for heating an absorbent 140 circulating inside.

The reaction tower 110 and the desorption tower 120 are connected to each other, and the adsorbent 140 or the absorbent 140 is filled and circulated therein, and the adsorption and desorption of carbon dioxide or absorption and desorption of carbon dioxide are alternately repeated.

At this time, the adsorption refers to the physical binding of gaseous carbon dioxide and a solid adsorbent, and the absorption refers to the chemical binding of the gaseous carbon dioxide and the solid absorbent, which may be classified according to a form in which carbon dioxide is adsorbed or absorbed.

The adsorbent may be at least one selected from the group consisting of a zeolite-based adsorbent and a carbon-based adsorbent.

The absorbent may be at least one selected from the group consisting of an amine-based polymer absorbent and a porous silica absorbent grafted with an organic material having an amine group.

The reaction tower 110 is supplied with the exhaust gas to the lower end of the reaction tower 110 and includes the carbon dioxide adsorption unit 111 for adsorbing the carbon dioxide from the exhaust gas or the carbon dioxide absorption unit 111 for absorbing the carbon dioxide from the exhaust gas.

The carbon dioxide adsorption unit 111 or the carbon dioxide absorption unit 111 adsorbs and absorbs carbon dioxide, and the exhaust gas from which carbon dioxide is removed is emitted to the outside through the upper end of the reaction tower 110 and the adsorbent 141 on which carbon dioxide is adsorbed or the absorbent 141 in which carbon dioxide is absorbed is transferred to the heat exchange unit 130.

The operation temperature of the reaction tower 110 may vary depending on a type of the adsorbent 140 or the absorbent 140 to be used and a composition of the exhaust gas, and the operation may be performed at 20° C. to 80° C., specifically 30° C. to 70° C. As the operation of the reaction tower 110 is performed in the range of 20° C. to 80° C., the physical adsorption or chemical absorption of carbon dioxide in the exhaust gas may be easily performed.

The desorption tower 120 includes one or more heating means on one side or one end of the desorption tower 120 to heat the adsorbent 140 or the absorbent 140 circulating inside the desorption tower 120. Specifically, the desorption tower 120 may include the adsorbent heating unit 121 or the absorbent heating unit 121 which supplies sweeping gas from the lower end of the desorption tower 120 to transfer the adsorbent 140 or the absorbent 140 circulating inside the desorption tower 120 in one direction and supplies a steam as a heating means from one side of the desorption tower 120 to heat the adsorbent 140 or the absorbent 140 circulating inside the desorption tower 120.

The adsorbent 142 heated by the adsorbent heating unit 121 or the absorbent 142 heated by the absorbent heating unit 121 is transferred to the heat exchange unit 130.

The operation temperature of the desorption tower 120 may vary depending on a type of the adsorbent 140 or the absorbent 140 to be used and a composition of the exhaust gas, and the operation may be performed at 80° C. to 150° C., specifically 90° C. to 140° C. As the operation of the desorption tower 120 is performed in the range of 80° C. to 150° C., carbon dioxide of the adsorbent 141 on which carbon dioxide is adsorbed or the absorbent 141 in which carbon dioxide is absorbed is desorbed to be regenerated in a gas phase.

The heat exchange unit 130 directly heat-exchanges or indirectly heat-exchanges the adsorbent 141 on which carbon dioxide received from the reaction tower 110 is adsorbed and the adsorbent 142 received and heated from the desorption tower 120, or the absorbent 141 in which carbon dioxide received from the reaction tower 110 is absorbed and the absorbent 142 received and heated from the desorption tower 120 to desorb the carbon dioxide of the adsorbent 141 on which carbon dioxide is adsorbed or the absorbent 141 in which carbon dioxide is absorbed.

At this time, the adsorbent 141 on which carbon dioxide is adsorbed and the heated adsorbent 142 or the absorbent 141 in which carbon dioxide is absorbed and the heated absorbent 142 move in the same direction as each other, that is, in a co-current flow manner and are heat-exchanged with each other.

As described above, in the carbon dioxide capturing apparatus 100 according to the exemplary embodiment of the present disclosure of FIG. 1, for sensible heat exchange between the adsorbents 140 or the absorbents 140, the heat exchange unit 130 may be provided in parallel between the reaction tower 110 and the desorption tower 120.

On the other hand, referring to FIG. 1, the heat exchange unit 130 according to the present disclosure may perform direct heat exchange between the adsorbent 141 on which carbon dioxide is adsorbed and the heated adsorbent 142, or between the absorbent 141 in which carbon dioxide is absorbed and the heated absorbent 142.

Specifically, the heat exchange unit 130 may increase a heat exchange area so that the direct heat exchange between the adsorbent 141 on which carbon dioxide is adsorbed and the heated adsorbent 142, or between the absorbent 141 in which carbon dioxide is absorbed and the heated absorbent 142 is smoothly performed.

In order to increase the heat exchange area, the heat exchange unit 130 performing the direct heat exchange may include one or more first heat exchange units 131 in which the adsorbent 141 on which carbon dioxide is adsorbed or the absorbent 141 in which carbon dioxide is absorbed moves and one or more second heat exchange units 132 in which the heated adsorbent 142 or the heated absorbent 142 moves.

The heat exchange unit 130 performing the direct heat exchange may be provided with a plate-shaped heat exchange unit including the one or more first heat exchange units 131 and the one or more second heat exchange units 132, or a pipe-shaped heat exchange unit including the one or more first heat exchange units 131 and the one or more second heat exchange units 132.

FIGS. 3 and 4 illustrate the heat exchange unit 130 performing the direct heat exchange which is applied to the carbon dioxide capturing apparatus of the present disclosure.

Figure 3A:
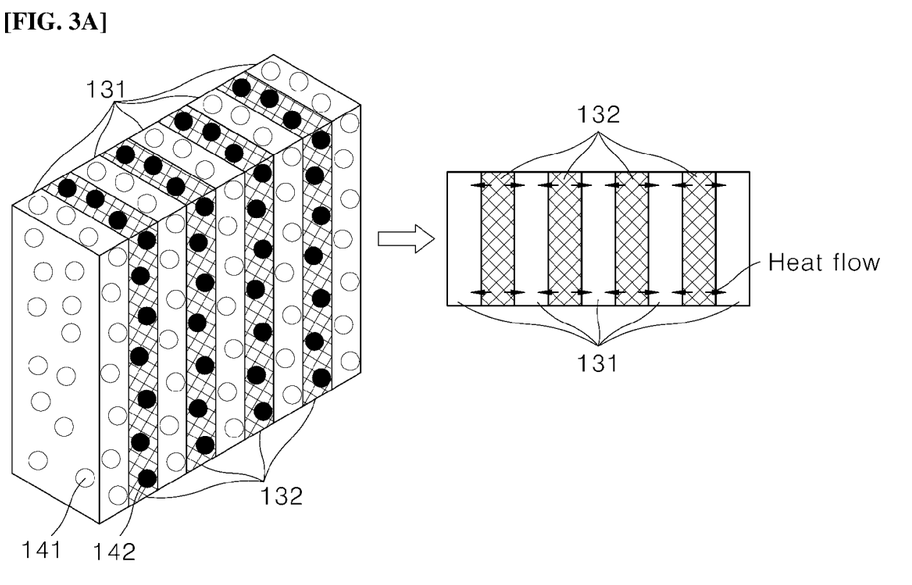
FIG. 3A illustrates a flow of an adsorbent or absorbent which passes through a plate-shaped heat exchange unit and FIG. 3B illustrates a flow of an adsorbent or absorbent which passes through a pipe-shaped heat exchange unit.
Figure 3B:
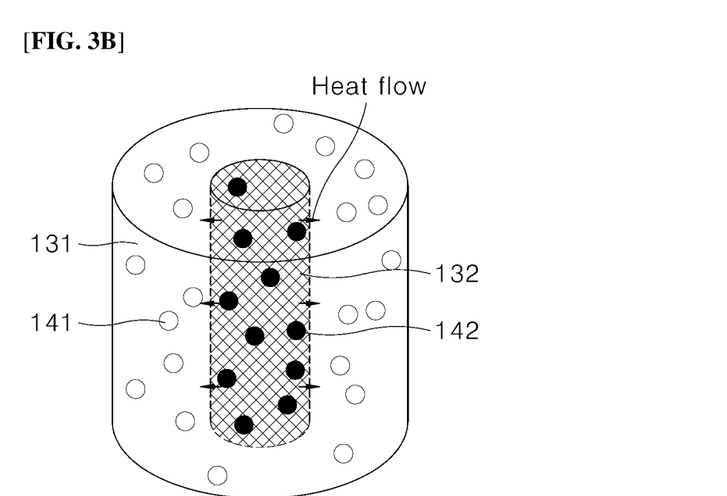

Specifically, FIG. 3 illustrates a flow of the adsorbent 141 on which carbon dioxide passing through the heat exchange unit 130 performing the direct heat exchange according to the exemplary embodiment of the present disclosure is adsorbed and the heated adsorbent 142 or the absorbent 141 in which the carbon dioxide is absorbed and the heated absorbent 142. Here, FIG. 3A illustrates a flow of the adsorbent 141 passing through the plate-shaped heat exchange unit and the heated adsorbent 142 or the absorbent 141 in which the carbon dioxide is absorbed and the heated absorbent 142 and FIG. 3B illustrates a flow of the adsorbent 141 passing through the pipe-shaped heat exchange unit and the heated adsorbent 142 or the absorbent 141 in which the carbon dioxide is absorbed and the heated absorbent 142.

Figure 4A:
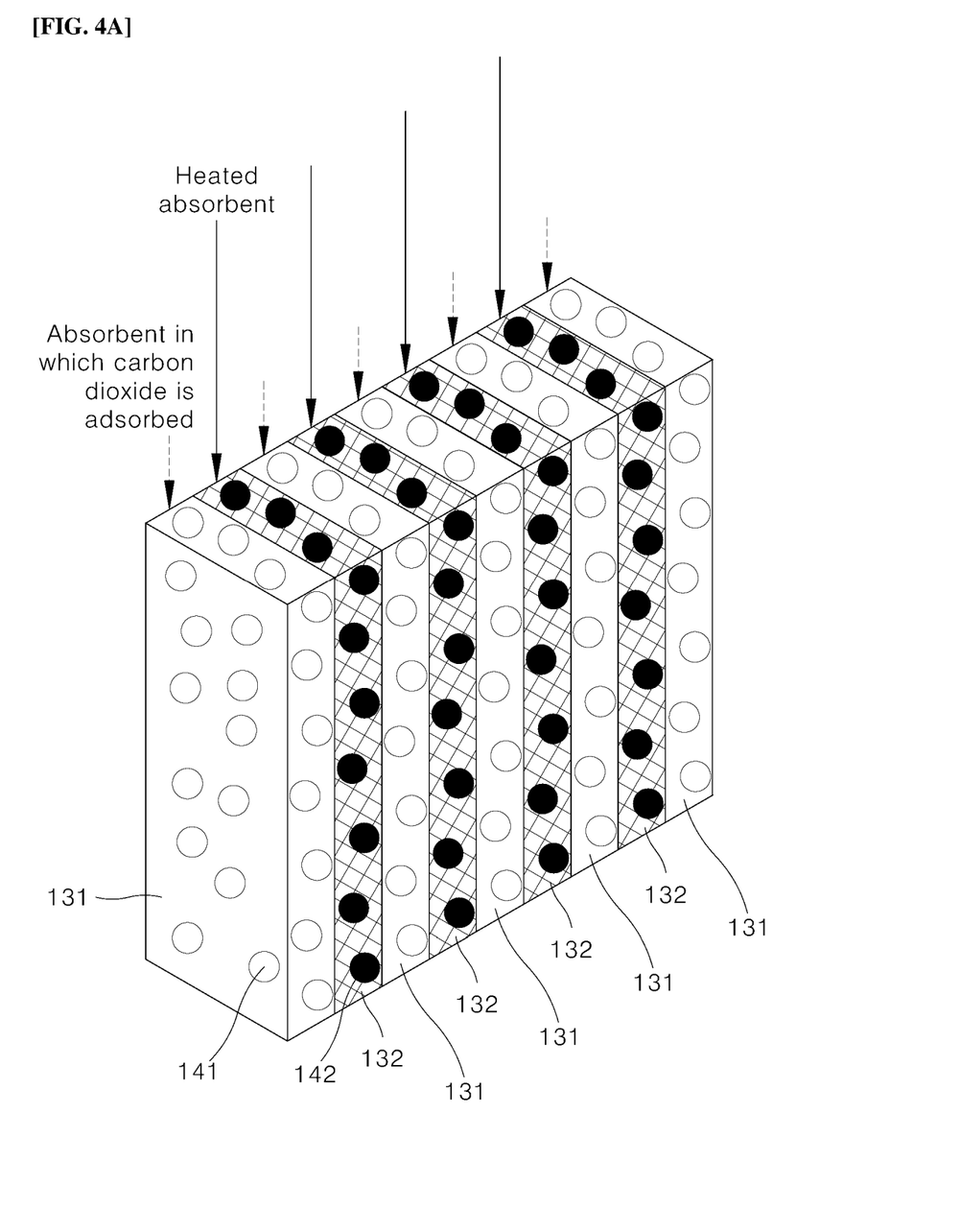
FIG. 4A illustrates a heat flow in the plate-shaped heat exchange unit and FIG. 4B illustrates a heat flow in the pipe-shaped heat exchange unit.
Figure 4B:
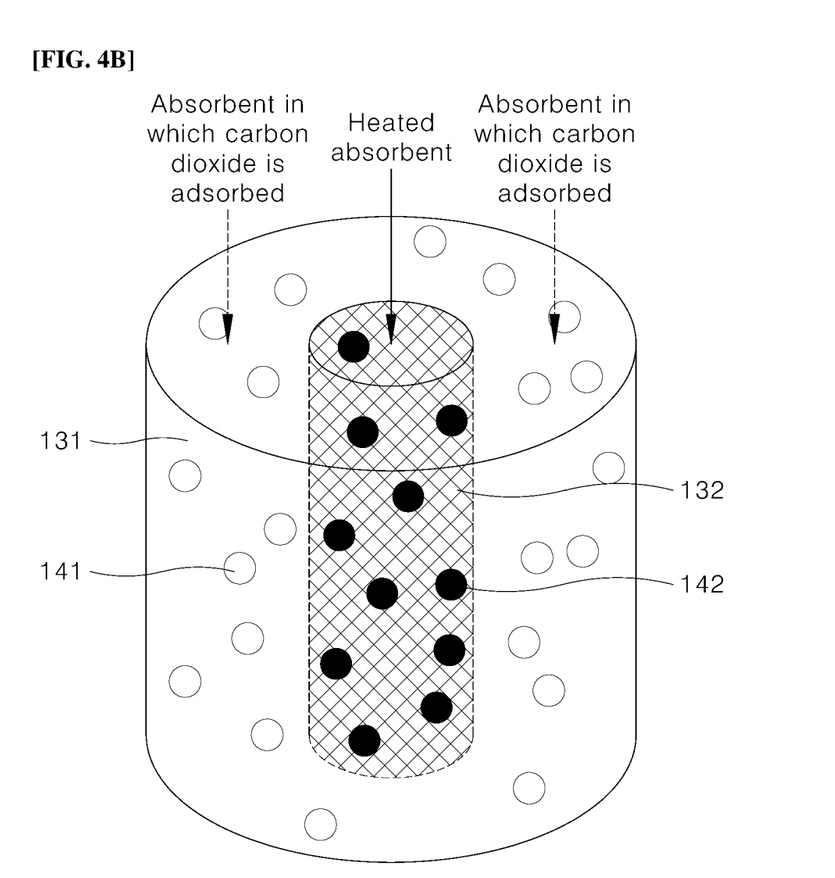

FIG. 4 illustrates a flow between the adsorbent 141 on which carbon dioxide is adsorbed inside the heat exchange unit 130 performing the direct heat exchange according to the exemplary embodiment of the present disclosure and the heated adsorbent 142 or the absorbent 141 in which the carbon dioxide is absorbed and the heated absorbent 142. Here, FIG. 4A illustrates a flow between the adsorbent 141 on which carbon dioxide is adsorbed inside the plate-shaped heat exchange unit and the heated adsorbent 142 or between the absorbent 141 in which the carbon dioxide is absorbed and the heated absorbent 142 and FIG. 4B illustrates a flow between the adsorbent 141 on which carbon dioxide is adsorbed inside the pipe-shaped heat exchange unit and the heated adsorbent 142 or between the absorbent 141 in which the carbon dioxide is absorbed and the heated absorbent 142.

First, referring to FIGS. 3A and 4A, the heat exchange unit 130 through which the adsorbent 141 on which carbon dioxide is adsorbed and the heated adsorbent 142 or the absorbent 141 in which the carbon dioxide is absorbed and the heated absorbent 142 pass may form a plate shape having a predetermined thickness. In the plate-shaped heat exchange unit, one or more first heat exchange units 131 through which the adsorbent 141 on which carbon dioxide is adsorbed or the absorbent 141 in which the carbon dioxide is absorbed passes and one or more second heat exchange units 132 through which the heated adsorbent 142 or the heated absorbent 142 passes are alternated with each other and surface-connected to each other so that one surface of the first heat exchange unit 131 and one surface of the second heat exchange unit 132 are in contact with each other. At this time, the heat of the heated adsorbent 142 or the heated absorbent 142 of the second heat exchange unit 132 is transferred to the first heat exchange unit 131 through a wall of the first heat exchange unit 131 to desorb carbon dioxide from the adsorbent 141 on which carbon dioxide is adsorbed or the absorbent 141 in which the carbon dioxide is absorbed.

In the plate-shaped heat exchange unit according to the present disclosure, when a plurality of first heat exchange units 131 and second heat exchange units 132 are alternated with each other and connected to each other, an area for heat exchange between the adsorbents or the absorbents is increased to increase the heat exchange efficiency.

In addition, referring to FIGS. 3B and 4B, the heat exchange unit 130 through which the adsorbent 141 on which carbon dioxide is adsorbed and the heated adsorbent 142 or the absorbent 141 in which the carbon dioxide is absorbed and the heated absorbent 142 pass may form a pipe shape having a predetermined thickness. In the pipe-shaped heat exchange unit, the second heat exchange unit 132 through which the heated adsorbent 142 or the heated absorbent 142 passes is inserted into the first heat exchange unit 131 through which the adsorbent 141 on which carbon dioxide is adsorbed or the absorbent 141 in which carbon dioxide is absorbed passes. At this time, the heat of the heated adsorbent 142 or the heated absorbent 142 of the second heat exchange unit 132 is transferred to the first heat exchange unit 131 through the wall of the first heat exchange unit 131 to desorb carbon dioxide from the adsorbent 141 on which carbon dioxide is adsorbed or the absorbent 141 in which the carbon dioxide is absorbed.

In the pipe-shaped heat exchange unit according to the present disclosure, one or more second heat exchange units 132 may be inserted into the first heat exchange unit 131, and at this time, the surface area of the second heat exchange unit 132 is increased to increase the heat exchange efficiency between the adsorbent or the absorbent.

Figure 5:
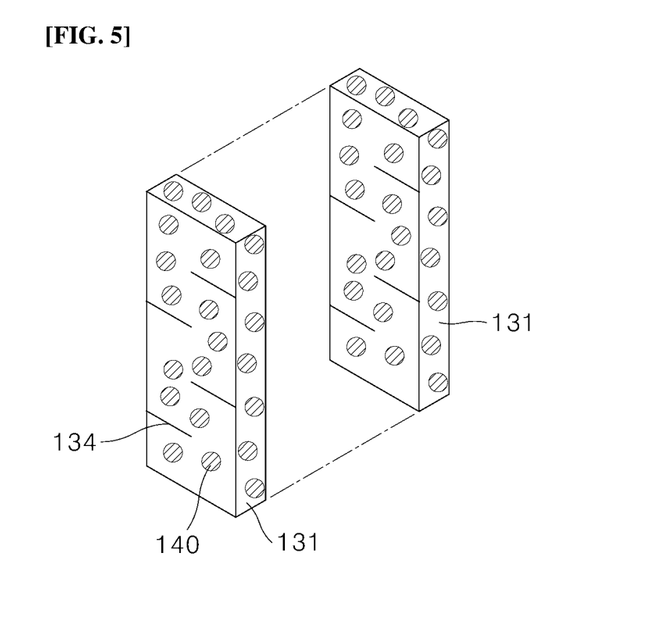
FIG. 5 is a diagram illustrating a configuration of adding a baffle to the heat exchange unit according to an exemplary embodiment of the present disclosure.

Meanwhile, the plate-shaped heat exchange unit according to the present disclosure may further include a baffle 134 in the heat exchange unit as illustrated in FIG. 5. Specifically, a multi-plate type heat exchange unit in which a plurality of first heat exchange units 131 and second heat exchange units 132 are alternated to each other and surface-connected to each other may include one or more baffles 134.

When one or more baffles 134 are provided in the multi-plate type heat exchange unit, the pressure applied to the first heat exchange unit 131 and the second heat exchange unit 132 may be dispersed according to a weight of the adsorbent 140 or the absorbent 140, the flowing adsorbent 140 or absorbent 140 does not vertically fall by the gravity and flows along a curve in which the baffle 134 is installed to reduce the fatigue of the multi-plate type heat exchange unit even when operating for a long time.

In addition, the heat exchange unit 130 according to the present disclosure may be provided with a gas aeration device (not illustrated) therein. The gas aeration device is provided inside the heat exchange unit 130 to prevent the adsorbent 140 or the absorbent 140 from being concentrated in the heat exchange unit 130, thereby increasing the heat transfer efficiency.

Figure 2:
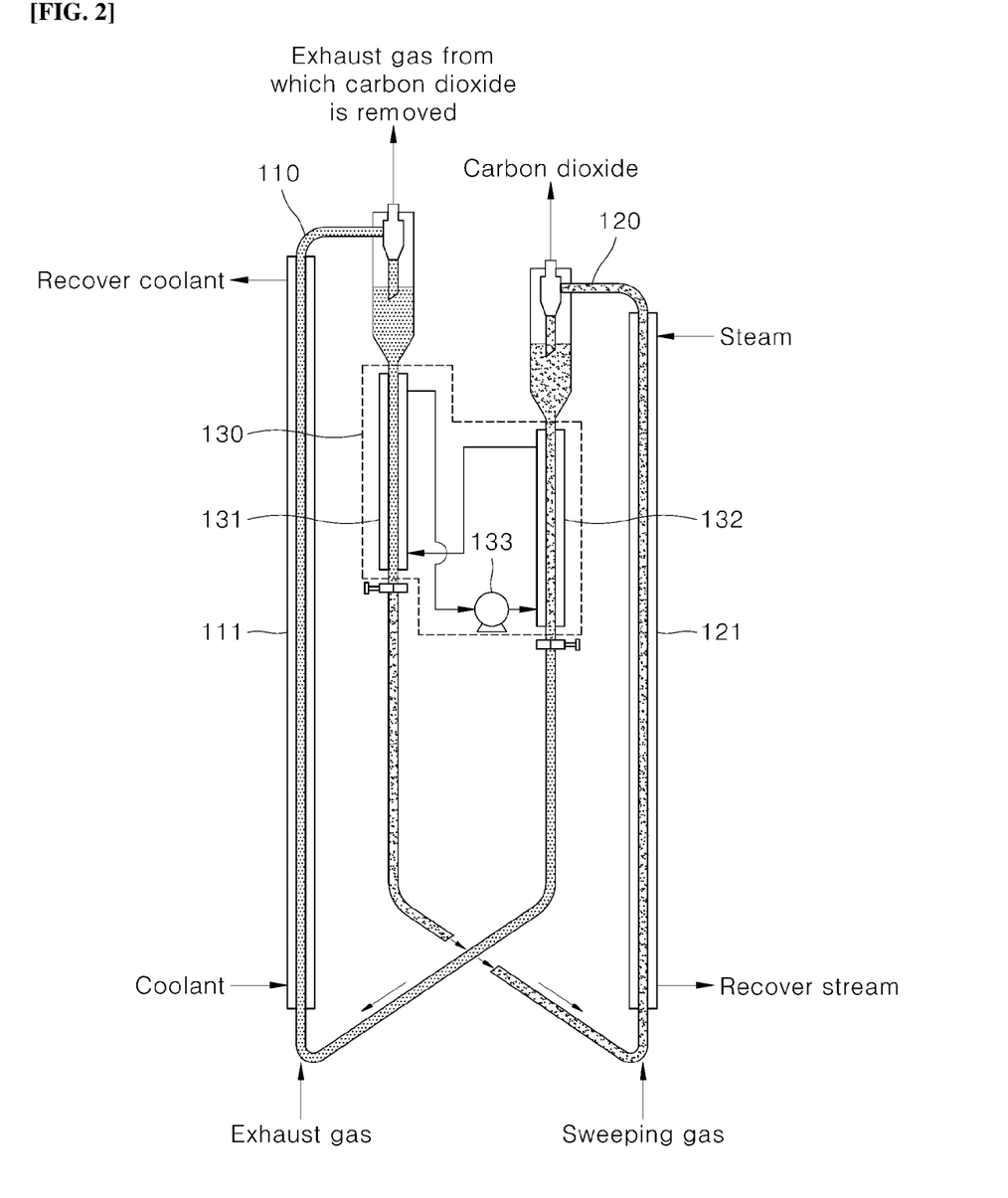
FIG. 2 is a diagram illustrating a carbon dioxide capturing apparatus according to another exemplary embodiment of the present disclosure.

FIG. 2 illustrates a carbon dioxide capturing apparatus according to another exemplary embodiment of the present disclosure.

Specifically, FIG. 2 illustrates a carbon dioxide capturing apparatus including a heat exchange unit 130 in which indirect heat exchange is performed.

Referring to FIG. 2, the heat exchange unit 130 according to the present disclosure may include a heat exchange unit which performs indirect heat exchange as well as direct heat exchange between an adsorbent 141 on which carbon dioxide is adsorbed and a heated adsorbent 142 or between an absorbent 141 in which carbon dioxide is absorbed and a heated absorbent 142. The heat exchange unit 130 performing indirect heat exchange includes a heat medium means 133 provided between a reaction tower 110 and a desorption tower 120, and the heat medium means 133 may perform the indirect heat exchange between the adsorbent 141 on which carbon dioxide is adsorbed and the heated adsorbent 142 or between the absorbent 141 in which carbon dioxide is absorbed and the heated absorbent 142.

The heat exchange unit 130 performing the indirect heat exchange may include one or more first heat exchange units 131 in which the adsorbent 141 on which carbon dioxide is adsorbed or the absorbent 141 in which carbon dioxide is absorbed moves and one or more second heat exchange units 132 in which the heated adsorbent 142 or the heated absorbent 142 moves.

Hereinafter, a carbon dioxide capturing method according to an exemplary embodiment of the present disclosure will be described in stages.

Specifically, hereinafter, the carbon dioxide capturing method using the carbon dioxide capturing apparatus including the heat exchange unit 130 performing direct heat exchange illustrated in FIG. 1 will be described in stages.

Figure 6:
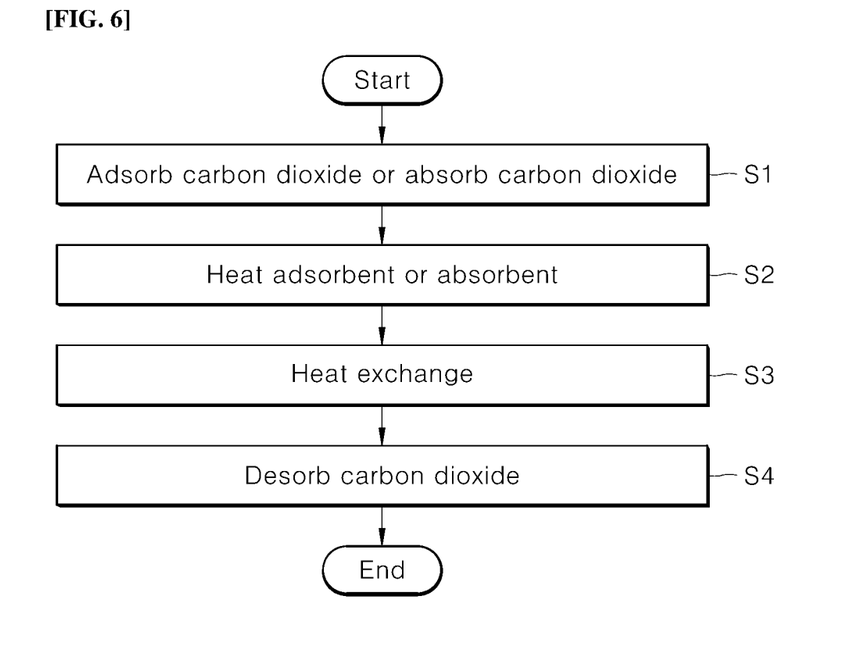
FIG. 6 is a flowchart illustrating a carbon dioxide capturing method according to an exemplary embodiment of the present disclosure.

As illustrated in FIG. 6, the carbon dioxide capturing method according to an exemplary embodiment of the present disclosure is a carbon dioxide capturing method comprising a carbon dioxide adsorption or carbon dioxide absorption step (S1), an adsorbent or absorbent heating step (S2), a heat exchange step (S3), and a carbon dioxide desorption step (S4).

The carbon dioxide adsorption or carbon dioxide absorption step (S1) is a step of adsorbing carbon dioxide from exhaust gas on the adsorbent or the absorbent in the reaction tower and may be a step of adsorbing or absorbing the carbon dioxide on the adsorbent or in the absorbent from the exhaust gas by introducing exhaust gas from the lower end of the reaction tower and introducing a coolant from one side of the reaction tower.

The carbon dioxide adsorption or carbon dioxide absorption step (S1) includes emitting the exhaust gas from which carbon dioxide is removed from the upper side of the reaction tower, after adsorbing or absorbing carbon dioxide on the adsorbent or in the absorbent from the exhaust gas.

The adsorbent or absorbent heating step (S2) is a step of heating the adsorbent or the absorbent circulating inside by heating the desorption tower and may be a step of heating the adsorbent or the absorbent circulating inside the desorption tower through one or more heating means on one side or one end of the desorption tower. At this time, in the adsorbent or absorbent heating step (S2), a steam may be used as a heating means.

Specifically, the adsorbent or absorbent heating step (S2) may transfer the adsorbent or the absorbent circulating inside the desorption tower in one direction by supplying sweeping gas from the lower end of the desorption tower and heat the adsorbent or the absorbent transferred in one direction by supplying the steam from one side of the desorption tower.

The heat exchange step (S3) is a step of performing direct heat exchange or indirect heat exchange between the adsorbent on which the carbon dioxide is adsorbed and the heated adsorbent or between the absorbent in which the carbon dioxide is absorbed and the heated absorbent by transmitting the adsorbent on which the carbon dioxide is adsorbed and the heated adsorbent or the absorbent in which the carbon dioxide is absorbed and the heated absorbent through the heat exchange unit in a co-current flow manner.

The carbon dioxide desorption step (S4) is a step of desorbing the carbon dioxide of the adsorbent on which the carbon dioxide is adsorbed or the absorbent in which the carbon dioxide is absorbed through the direct heat exchange or the indirect heat exchange between the adsorbent on which the carbon dioxide is adsorbed and the heated adsorbent or between the absorbent in which the carbon dioxide is absorbed and the heated absorbent.

Meanwhile, the carbon dioxide capturing method of the present disclosure further includes a step of circulating the adsorbent or the absorbent by desorbing the carbon dioxide of the adsorbent on which the carbon dioxide is adsorbed or the absorbent in which the carbon dioxide is absorbed in the carbon dioxide desorption step (S4), emitting the desorbed carbon dioxide from the upper end of the desorption tower, and discharging the adsorbent from which the carbon dioxide is desorbed and the heated adsorbent or the absorbent from which the carbon dioxide is desorbed and the heated absorbent from the lower end of the heat exchange unit, and repeat steps (S1) to (S4).

The above description just illustrates the technical spirit of the present disclosure and various changes and modifications can be made by those skilled in the art to which the present disclosure pertains without departing from an essential characteristic of the present disclosure. Accordingly, the various exemplary embodiments disclosed in the present disclosure are not intended to limit the technical spirit but describe the present disclosure and the technical spirit of the present disclosure is not limited by the following exemplary embodiments. The protective scope of the present disclosure should be construed based on the following claims, and all the techniques in the equivalent scope thereof should be construed as falling within the scope of the present disclosure.

A carbon dioxide capturing apparatus of the present invention circulates an adsorbent or absorbent heated by a reaction tower adsorbing or absorbing carbon dioxide and a heating means inside a desorption tower and performs heat exchange between an adsorbent on which carbon dioxide is adsorbed and a heated adsorbent, or between an absorbent in which carbon dioxide is absorbed and a heated absorbent, thereby reducing energy required for capturing carbon dioxide.

What is claimed is:

1. A carbon dioxide capturing apparatus comprising:
a reaction tower comprising a carbon dioxide adsorption unit or a carbon dioxide absorption unit that is configured to adsorbs or absorbs carbon dioxide from exhaust gas;
a desorption tower connected to the reaction tower, the desorption tower comprising:
an adsorbent heating unit configured to heat an adsorbent circulating inside the desorption tower, or an absorbent heating unit configured to heat an absorbent circulating inside the desorption tower;
an adsorbent or absorbent configured to circulate between the reaction tower and the desorption tower and alternately adsorb and desorb carbon dioxide, or alternately absorb and desorb carbon dioxide; and
a heat exchange unit configured to facilitate heat exchange between: an adsorbent on which carbon dioxide is adsorbed and a heated adsorbent, or an absorbent in which carbon dioxide is absorbed and a heated absorbent,
wherein the adsorbent on which carbon dioxide is adsorbed and the heated adsorbent, or the absorbent in which carbon dioxide is absorbed and the heated absorbent are transferred in a co-current flow manner within the heat exchange unit.

2. The carbon dioxide capturing apparatus of claim 1, wherein the heat exchange unit is provided in parallel between the reaction tower and the desorption tower.

3. The carbon dioxide capturing apparatus of claim 1, wherein the heat exchange unit performs direct heat exchange or indirect heat exchange between the adsorbent on which carbon dioxide is adsorbed and the heated adsorbent, or between the absorbent in which carbon dioxide is absorbed and the heated absorbent.

4. The carbon dioxide capturing apparatus of claim 3, wherein the heat exchange unit performing the indirect heat exchange comprises a heat medium conduit provided between the reaction tower and the desorption tower, the conduit configured to transfer thermal energy between the adsorbent or absorbent and the heated adsorbent or heated absorbent.

5. The carbon dioxide capturing apparatus of claim 3, wherein the heat exchange unit performing the direct heat exchange comprises: a first heat exchange unit configured to transfer the adsorbent on which carbon dioxide is adsorbed or the absorbent in which carbon dioxide is absorbed; and a second heat exchange unit configured to transfer the heated adsorbent or the heated absorbent.

6. The carbon dioxide capturing apparatus of claim 3, wherein the heat exchange unit is a pipe-shaped structure comprising one or more first heat exchange units and one or more second heat exchange units configured to separately handle the adsorbent or absorbent and the heated adsorbent or heated absorbent, respectively.

7. The carbon dioxide capturing apparatus of claim 3, wherein the heat exchange unit is a plate-shaped heat exchange unit that includes one or more baffles.

* * * * *